(12) United States Patent
Brundage

(10) Patent No.: US 7,065,228 B2
(45) Date of Patent: Jun. 20, 2006

(54) INJECTION MOLDING PROCESS INCLUDING DIGITAL WATERMARKING AND ARTICLES MANUFACTURED FROM INJECTION MOLDING PROCESS

(75) Inventor: Trent J. Brundage, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 662 days.

(21) Appl. No.: 10/286,357

(22) Filed: Oct. 31, 2002

(65) Prior Publication Data

US 2004/0086151 A1 May 6, 2004

(51) Int. Cl.
*G06K 9/00* (2006.01)

(52) U.S. Cl. ............... 382/100; 382/243; 264/297.2

(58) Field of Classification Search ............ 382/100, 382/112, 116, 135, 139, 168, 232–239, 243, 382/274, 291; 264/297.2; 106/162.51; 428/412; 235/486, 492
See application file for complete search history.

(56) References Cited

U.S. PATENT DOCUMENTS

| | | | |
|---|---|---|---|
| 5,822,436 A | | 10/1998 | Rhoads |
| 6,090,195 A | * | 7/2000 | Andersen et al. ........ 106/162.51 |
| 6,117,384 A | * | 9/2000 | Laurin et al. ............ 264/297.2 |
| 6,122,403 A | * | 9/2000 | Rhoads ....................... 382/233 |
| 6,311,214 B1 | | 10/2001 | Rhoads |
| 6,458,913 B1 | | 10/2002 | Honigfort et al. |
| 6,465,102 B1 | * | 10/2002 | Honigfort et al. ........... 428/412 |
| 6,779,729 B1 | * | 8/2004 | Batlaw et al. ............... 235/486 |
| 6,843,422 B1 | * | 1/2005 | Jones et al. ................. 235/492 |
| 2001/0001854 A1 | | 5/2001 | Schena et al. |
| 2001/0037455 A1 | | 11/2001 | Lawandy et al. |
| 2001/0055258 A1 | | 12/2001 | Carson et al. |
| 2002/0023218 A1 | | 2/2002 | Lawandy et al. |
| 2002/0081413 A1 | | 6/2002 | Dalla Verde |
| 2003/0061500 A1 | | 3/2003 | Mimura et al. |

FOREIGN PATENT DOCUMENTS

| | | |
|---|---|---|
| EP | 1143723 | 10/2001 |
| WO | WO02/27617 | 4/2002 |
| WO | WO03/0052091 | 1/2003 |

OTHER PUBLICATIONS

U.S. Appl. No. 09/503,881, filed Feb. 14, 2000, Rhoads et al.
U.S. Appl. No. 09/571,422, filed May 15, 2000, Rhoads et al.
U.S. Appl. No. 09/151,492, filed Sep. 11, 1998, Davis et al.
U.S. Appl. No. 09/562,524, filed May 1, 2000, Carr et al.
U.S. Appl. No. 09/552,998, filed Apr. 19, 2000, Hannigan et al.
U.S. Appl. No. 09/670,114, filed Sep. 26, 2000, Rhoads et al.

(Continued)

*Primary Examiner*—Sanjiv Shah
*Assistant Examiner*—Seyed Azarian
(74) *Attorney, Agent, or Firm*—Digimarc Corporation

(57) ABSTRACT

The present invention relates to methods of marking objects produced through a molding process. The marking facilitates authentication of the objects. A cellular phone faceplate is steganographically marked in one implementation of the invention.

36 Claims, 3 Drawing Sheets

OTHER PUBLICATIONS

Printout of http://www.geimd.com/detail/process1.html on Oct. 30, 2002 (1 page).
Printout of http://www.geimd.com/detail/material1.html on Oct. 30, 2002 (1 page).
Printout of http://www.geimd.com/detail/process_screen_printing.html on Oct. 30, 2002 (2 pages).
Printout of http://www.geimd.com/detail/process_film_form-ing.html on Oct. 30, 2002 (3 pages).
Printout of http://www.geimd.com/detail/process_trimming.html on Oct. 30, 2002 (3 pages).
Printout of http://www.geimd.com/detail/process_im.html on Oct. 30, 2002 (1 page).

* cited by examiner

Cell Phone Faceplate

INJECTION MOLDING PROCESS INCLUDING DIGITAL WATERMARKING AND ARTICLES MANUFACTURED FROM INJECTION MOLDING PROCESS

RELATED APPLICATION DATA

The subject matter of the present application is related to that disclosed in U.S. patent application Ser. No. 09/503,881 (now U.S. Pat. No. 6,614,914) U.S. Pat. No. 6,122,403 and PCT Patent Application No. PCT/US02/20832 (published in English as WO 03/005291). Each of these patent documents is herein incorporated by reference.

FIELD OF THE INVENTION

The present invention relates to authentication via steganographic encoding. A preferred form of encoding is digital watermarking.

BACKGROUND AND SUMMARY OF THE INVENTION

Counterfeiting and forgeries continue to proliferate. A hot area of counterfeiting is consumer products, such as cellular phones and cameras. Often cellular phones include interchangeable faceplates. (Or a camera includes a logo plate, which is easily replicated by thieves.). A common counterfeiting scenario involves counterfeiting the faceplate, and then passing off the counterfeit faceplate as genuine.

One solution is to provide steganographic auxiliary data in the faceplate to help prevent or detect counterfeiting. The data can be decoded to determine whether the object is authentic. The auxiliary data may also provide a link to a network resource, such as a web site or data repository. The absence of expected auxiliary data may also provide a clue regarding counterfeiting.

One form of encoding is accomplished with digital watermarking. Digital watermarking systems typically have two primary components: an encoder that embeds the watermark in a host media signal, and a decoder (or reader) that detects and reads the embedded watermark from a signal suspected of containing a watermark. The encoder embeds a watermark by altering the host media signal. The decoding component analyzes a suspect signal to detect whether a watermark is present. In applications where the watermark encodes information, the decoder extracts this information from the detected watermark.

One challenge to the developers of watermark embedding and reading systems is to ensure that the watermark is detectable even if the watermarked media content is transformed in some fashion. The watermark may be corrupted intentionally, so as to bypass its copy protection or anti-counterfeiting functions, or unintentionally through various transformations (e.g., scaling, rotation, translation, etc.) that result from routine manipulation of the content. In the case of watermarked images, such manipulation of the image may distort the watermark pattern embedded in the image.

A watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

There are a variety of alternative embodiments of an embedder and detector. One embodiment of the embedder performs error correction coding of a binary message, and then combines the binary message with a carrier signal to create a component of a watermark signal. It then combines the watermark signal with a host signal. To facilitate detection, it may also add a detection component to form a composite watermark signal having a message and detection component. The message component includes known or signature bits to facilitate detection, and thus, serves a dual function of identifying the mark and conveying a message. The detection component is designed to identify the orientation of the watermark in the combined signal, but may carry an information signal as well. For example, the signal values at selected locations in the detection component can be altered to encode a message.

One embodiment of the detector estimates an initial orientation of a watermark signal in a host signal, and refines the initial orientation to compute a refined orientation. As part of the process of refining the orientation, this detector computes at least one orientation parameter that increases correlation between the watermark signal and the host signal when the watermark or host signal is adjusted with the refined orientation.

Another detector embodiment computes orientation parameter candidates of a watermark signal in different portions of the target signal, and compares the similarity of orientation parameter candidates from the different portions. Based on this comparison, it determines which candidates are more likely to correspond to a valid watermark signal.

Yet another detector embodiment estimates orientation of the watermark in a target signal suspected of having a watermark. The detector then uses the orientation to extract a measure of the watermark in the target. It uses the measure of the watermark to assess merits of the estimated orientation. In one implementation, the measure of the watermark is the extent to which message bits read from the target signal match with expected bits. Another measure is the extent to which values of the target signal are consistent with the watermark signal. The measure of the watermark signal provides information about the merits of a given orientation that can be used to find a better estimate of the orientation. Of course other watermark embedder and detectors can be suitably interchanged with some embedding/detecting aspects of the present invention.

Some techniques for embedding and detecting watermarks in media signals are detailed in the assignee's U.S. patent application Ser. No. 09/503,881 (now U.S. Pat. No. 6,614,914), U.S. Pat. No. 6,122,403 and PCT Patent Application PCT/US02/20832 (published in English as WO 03/005291) mentioned above.

Injection molding is known as an efficient means for producing articles of manufacture. GE Corporation has recently developed an injection molding process, which can provide a logo or graphic in an object manufactured through injection molding (i.e., see GE's so-called "In-Mold Decoration" process). In a typical in-mold decorating process, a printed substrate is formed into a three-dimensional shape and placed into a mold. Molten resin is then injected into a mold cavity space behind the formed substrate, forming a single molded part. Further details to these techniques can be found, e.g., in U.S. Pat. Nos. 6,465,102, 6,458,913 and 6,117,384, which are each herein incorporated by reference.

One improvement provides steganographic auxiliary data to facilitate authentication of an injection-molded part. In one implementation, auxiliary data is provided on a first print receiving material, e.g., through printing or laser engraving. In some cases, auxiliary data is steganographically encoded in an image, graphic or design. The encoded image, graphic or design is printed or engraved on the first print receiving material. The printed, first print receiving material is then combined with a second material through an injection molding process. The first print receiving material provides a protective layer for the steganographic auxiliary data. The auxiliary data provides an authentication tool to help determine whether the object is authentic.

Another aspect of the present invention is an injection-molded object including a hidden steganographic signal encoded (or embedded) therein.

Yet another aspect of the present invention is an authentication process to determine whether an object is authentic. The authentication process detects an auxiliary signal hidden in the object. The signal is decoded to determine whether the object is authentic.

The foregoing and other features and advantages of the present invention will be even more readily apparent from the following detailed description, which proceeds with reference to the accompanying drawings.

DETAILED DESCRIPTION

The following description outlines various methods for steganographically encoding objects with auxiliary data. (The present invention also encompasses articles of manufacture produced according to these inventive methods.). While specific examples are provided for cell phone faceplates and camera logo parts, the present invention is not so limited. Indeed, my inventive techniques can be applied to many other items including personal digital assistants (PDAs), plastic logos (e.g., for attachment to articles such as shoes and clothing, equipment or consumer products), handheld and console video games, pagers, dashboards, stereo faceplates or covers, plastic articles, injection molded parts, etc., etc.

Figure 1:
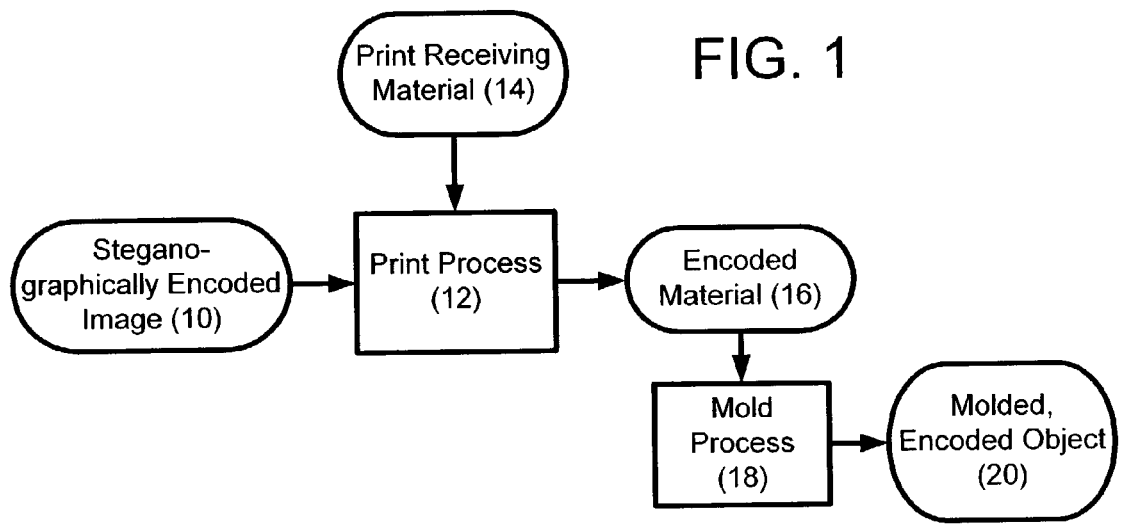
FIG. 1 illustrates an object manufacturing process including a steganographically-hidden signal.

With reference to FIG. 1, a steganographically-encoded image 10 (e.g., a company or product logo, graphic, design, photograph, background tint, pattern, etc.) is provided to a print process 12. The steganographically encoding is preferably subtle, e.g., it is generally imperceptible to human viewers of the encoded image, but is machine-readable with computer analysis. In some implementations, however, the encoding is in the form of a tint or background pattern. In these implementations, the tint or pattern may be perceptible, but the marking itself is still generally imperceptible to a human viewer of the tint or background pattern, unlike a bar code. (For example, a human viewer recognizes that a bar code is a marking, even though they may not be able to decipher the marking without the aid of computer analysis.). In some implementations the steganographic encoding includes a digital watermark. Some digital watermarking techniques make slight changes to an image, e.g., by changing data representing the image, whether in the form of DCT coefficients, wavelet coefficients, pixel values, or other interchangeable representation—to thereby encode the auxiliary information.

The steganographic encoding preferably conveys a message or payload. In some implementations the message or payload includes a unique identifier for identifying the object or image. Or the message or payload may authentication clues. In other implementations the message or payload provides auxiliary information, e.g., pertaining to the object or object's manufacturing details, distribution history, etc. In still other implementations the message or payload includes a link or index to a data repository. The data repository includes the identifier, authentication clues, and/or auxiliary information. (See assignee's U.S. patent application Ser. No. 09/571,422 (now U.S. Pat. No. 6,947,571) herein incorporated by reference, for some related linking techniques. The disclosed techniques are suitably interchangeable with the linking aspect of the present invention.).

The steganographic encoding may be optionally fragile, e.g., the encoding is destroyed (or irreproducible) or predictably degrades upon signal processing such as scanning and printing. The encoding techniques disclosed, e.g., in assignee's PCT patent application PCT/US02/20832 may be used to produce fragile encoding. Of course, other fragile encoding techniques may be suitable interchanged with this aspect (e.g., fragile encoding) of the present invention.

The encoding may include an orientation component which is useful in helping to resolve image distortion such as rotation, scaling, and translation, etc., and/or to help detect the message or payload. The orientation component may be a separate signal, or may be combined (or concatenated) with the message or payload.

The encoding may also be redundantly embedded throughout the image so as to redundantly convey the message or payload. Or the encoding may be object or location specific. For example, if the image includes a graphic or logo, the encoding can be limited to the graphic or logo.

In some implementations two or more digital watermarks are steganographically encoded in an image. The two or more watermarks can cooperate to help authenticate the image or associated object. For example, each of the two watermarks may include overlapping payload information that can be compared to determine whether the object is authentic. If the overlapping information does not match or cooperate in a predetermined manner, the object is considered not authentic. Or a first digital watermark may be fragile, while a second digital watermark is robust. Still further, a first digital watermark may include an orientation component, while the second digital watermark includes a message or payload. Or a first digital watermark may include a key to decrypt or otherwise assist in decoding a second digital watermark.

In some implementations, a steganographic-encoded image is printing with an ultraviolet (UV) or infrared (IR) ink or dye. These materials (and encoded image) need not be perceptible to a human viewer thereof. Instead, this type of encoding is machine-readable from scan data (e.g., captured with UV or IR detection) associated with the printing.

Returning to FIG. 1, a print receiving material 14 is also provided to the print process 12. In some implementations, the print process 12 includes a receiving material reservoir from which it obtains the print receiving material 14. In a preferred implementation, the print receiving material 14 comprises a polycarbonate (PC), acrylnitrile-butadiene-styrene (ABS), polyethylene terephthalate (PET), and acrylic (or a combination of such materials). Other acceptable materials are listed in U.S. Pat. Nos. 6,465,102, 6,458,913 and 6,117,384, which are incorporated above. These materials provide acceptable print receiving and/or injection molding cooperation characteristics. My most preferred implementation employs a Lexan® polycarbonate sheet as a print receiving material 14. Of course, the Lexan® sheet can vary in thickness, but for most applications I prefer a sheet with a thickness in the range of 5–25 mils. My most preferred thickness is about 10 mils, which I then can offset print. Of course, the thickness can be varied depending on print process and molding conditions.

Figure 2:
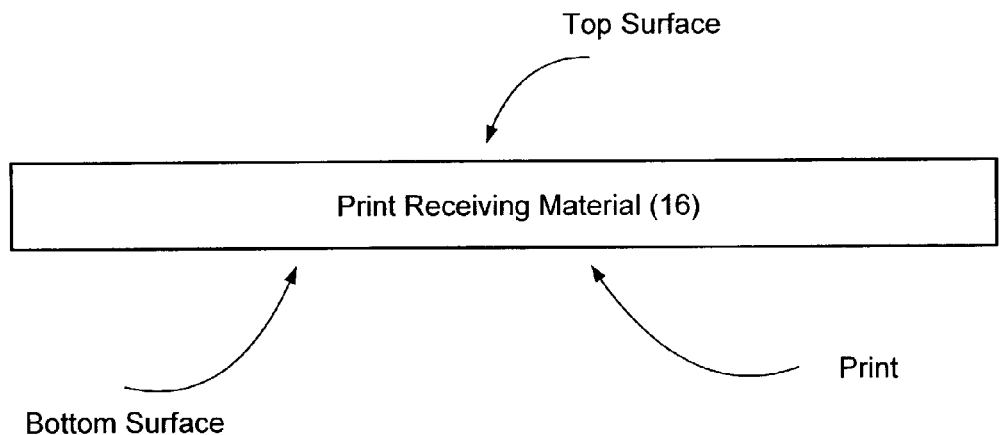
FIG. 2 illustrates a print receiving material.

With reference to FIG. 2, the print process 12 prints or otherwise applies the steganographically-encoded image 10 to a bottom surface of the print receiving material 14. In some implementations, the print receiving substrate 14 is generally transparent. This allows the steganographically-encoded image 10 to be perceived when viewed from a top surface of the printed encoded print receiving material 16. (Since the bottom surface of the material 14 is printed, the image can be reversed (or flipped) prior to (or during) printing so that, when viewed through a top surface of the material 14, the image 10 appears to be oriented correctly. Otherwise, the image when viewed from the top surface of the material 10 may appear to be reversed or flipped. In some cases the provided encoded image 10 is suitable flipped or reserved as received by the print process. Reversing or flipping (e.g., flipping the image in a left to right manner) the image is readily accomplished, e.g., with image editing software such as Adobe's Photoshop or Jasc Software's PaintShop Pro, etc., etc.).

The print process preferably includes an offset printing process. Of course, alternative printing processes may be employed with the present invention. Some of these alternative-printing processes include screen-printing, dye-diffusion thermal transfer (D2T2) printing, and ink or laser jet printing. Please note, however, that some care should be given to the selection of the printing ink/process to ensure that the ink can withstand the temperatures and pressure involved with a mold process.

As an optional step, a tie coat (not shown) is provided over the printing to help tie the print to the material 16.

Figure 3:
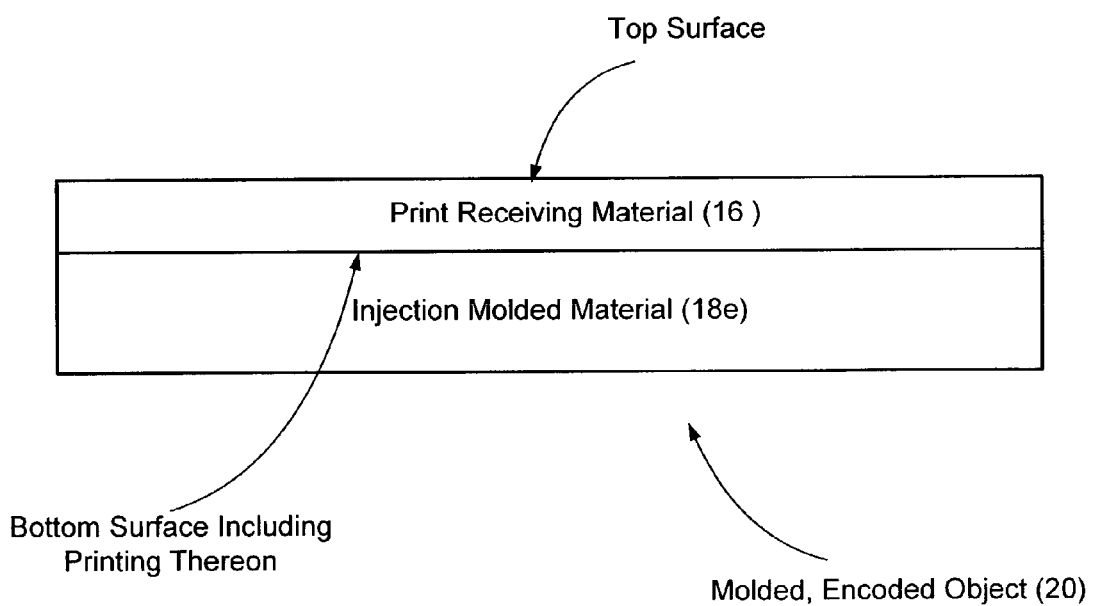
FIG. 3 illustrates a cross-section of a molded encoded object.

Returning again to FIG. 1, the encoded printed print receiving material 16 is provided to a mold process 18 (e.g., an injection molding process). The print receiving material 16 is preferably positioned in the mold so as to have the bottom surface of the print receiving material 16 adjacent to a second material, e.g., injected polycarbonate or polymeric resin (or other suitable injection materials). Some additional examples of suitable second materials and processes are found, e.g., in U.S. Pat. Nos. 6,465,102, 6,458,913 and 6,117,384, which are incorporated herein by reference above. Of course, if a resin, adhesive or tie coat is employed with the print receiving material, the resin, adhesive or tie may be adjacently arranged with respect to the second material. With reference to FIG. 3, a finished molded encoded object 20 will include a second material layer 18e adjacently positioned with respect to a bottom surface of a print receiving material.

Figure 4:
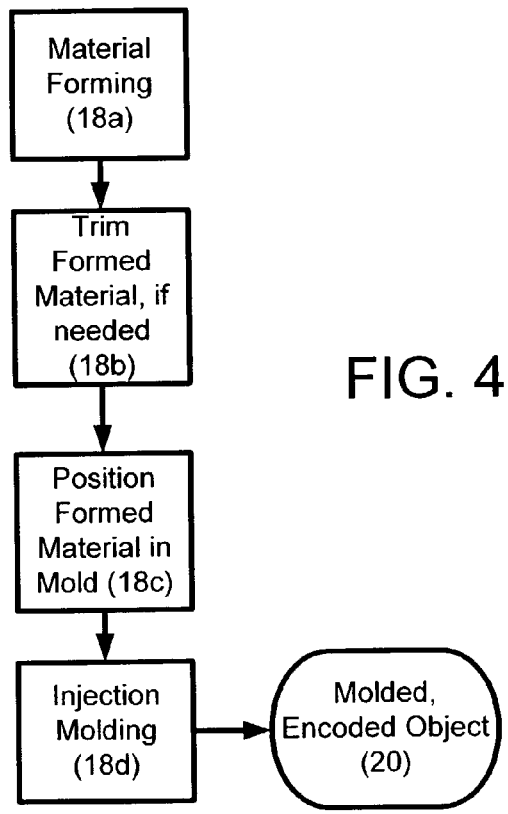
FIG. 4 illustrates one implementation of an injection molding process for the FIG. 1 mold process.

One exemplary mold process 18 is shown with reference to FIG. 4. The encoded material 16 is pre-formed 18a to better fit within an injection mold (or molding tool), e.g., formed via vacuuming forming, pressure forming, etc. The formed material can be trimmed or cut 18b to better fit within a mold cavity (or mold tool) or to better conform to a final object or part, if needed. The trimmed, formed material is positioned within a mold 18c and materials (e.g., plastics) are injected into the mold 18d. A molded, encoded object 20 is produced.

In an alternative mold process 18, the printed encoded material 16 is combined with a second material layer (e.g., plastic) layer through a heat and/or pressure process. An adhesive may be optionally employed to help bond the printed encoded material 16 with the second material layer.

In yet another alternative mold process 18, the printed encoded material 16 is provided to an injection molding processing, where it is combined with injected material to form a molded, encoded object 20. For example, the printed encoded material 16 is formed into a three-dimensional shape and placed into a mold. Molten resin is then injected into a mold cavity space behind the formed printed encoded material 16, forming a molded part.

When printed on a bottom surface of a print receiving material, a printed image is protected by the depth (or thickness) of the print receiving material 16. An intrusion attempt (e.g., to "scratch off" of otherwise alter the encoded printed image) must tunnel through the print receiving material to access the image. Moreover, depending on the mold process 18, the print receiving material may bond or otherwise adhere to the mold material layer—further complicating access to the encoded image. An intrusion attempt in this case would result in significant damage to the molded object 20.

In some cases, perhaps due to heat and pressure of a mold process in comparison to print inks used in a printing, there may be some distortion or warping of a printed image. A steganographic calibration signal may be used to help register or align the image for accurate steganographic encoding detection.

Figure 5:
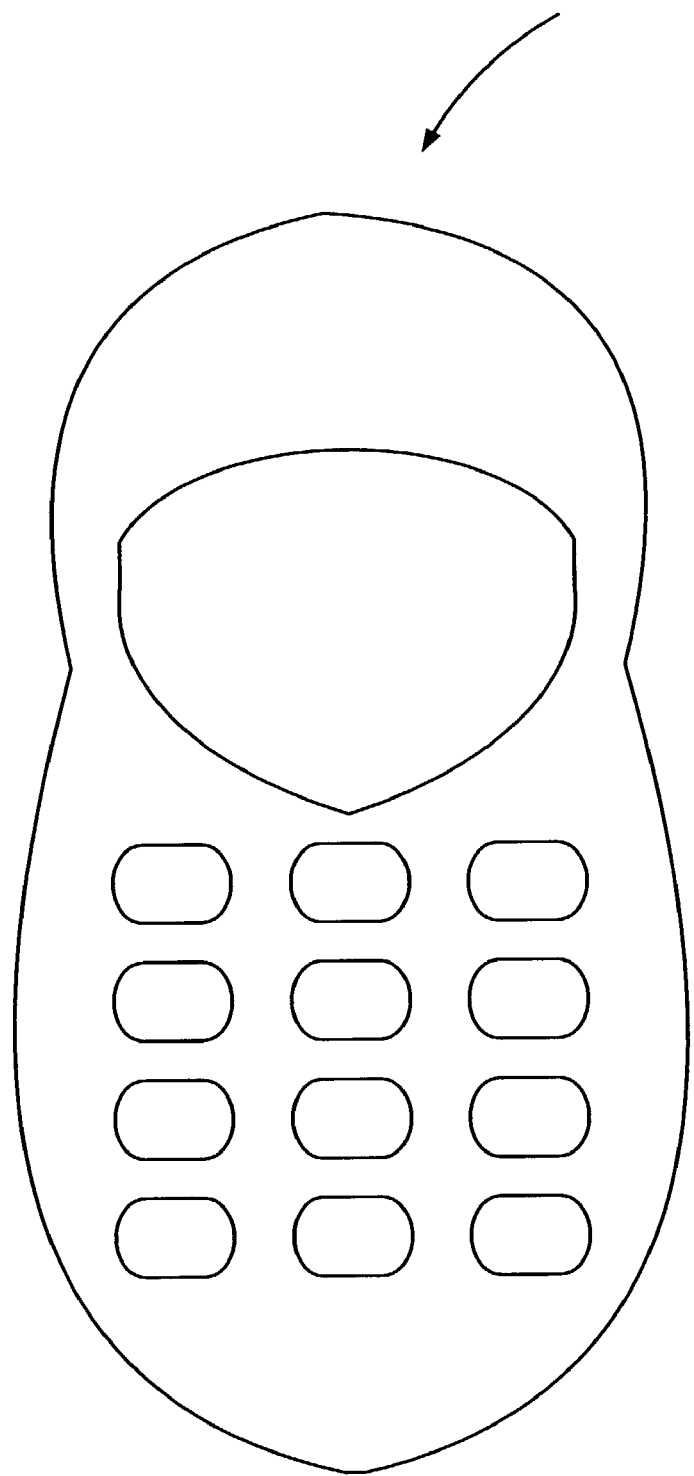
FIG. 5 illustrates a cellular phone faceplate including a steganographic signal encoded therein.

An exemplary embodiment of the present invention includes a cell phone faceplate (FIG. 5). The faceplate includes a steganographically-encoded image (not shown in FIG. 5). The steganographic encoding includes a message or payload. The message or payload provides a tool for authenticating the faceplate. For example, the presence of the message or payload may itself signal that the faceplate is authentic. Or the condition of the encoding may indicate that it is a copy (aka, a fragile digital watermark). Still further, a message or payload may include a link to a network resource, which provides information to help authenticate the faceplate. In other implementations, the message or payload includes information that can be cross-correlated with information carried elsewhere on the faceplate or cell phone. For example, the payload or message may include information for comparison against a serial number (or frequency code) printed or engraved on the faceplate or cell phone. And, of course, other steganographic encoding techniques discussed above, including a calibration signal, can be employed with the cell phone faceplate of FIG. 5. In other implementations, the encoding includes two or more digital watermarks. In preferred implementations of this embodiment, the FIG. 5 cell phone faceplate is manufactured according to the FIG. 1 process.

An inspector can determine whether the cell phone faceplate is authentic by capturing an image of the faceplate (e.g., with an optical sensor, digital camera, etc., etc.). A steganographic decoder analyzes a captured image to determine whether steganographic encoding is present in the captured image. If present, the decoder decodes a message or payload contained therein.

The present invention is not limited to cell phone faceplates. Indeed, the present invention encompasses many other objects such as personal digital assistants (PDAs), molded logos (e.g., for attachment to articles such as shoes and clothing, equipment or consumer products), handheld and console video games, pagers, dashboards, stereo faceplates or covers, plastic articles, injection molded parts, etc., etc.

CONCLUDING REMARKS

To provide a comprehensive disclosure without unduly lengthening this specification, applicant incorporates by reference the above-cited patent documents.

Having described and illustrated the principles of the invention with reference to illustrative embodiments, it should be recognized that the invention is not so limited. The present invention finds application beyond such illustrative embodiments.

For example, the technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

In some embodiments of the present invention, the print receiving material comprises a white layer of ink or dye that is applied to the bottom surface thereof. The white ink or dye helps to enunciate ink that is applied thereto in the form of an encoded image. In other embodiments, an encoded image 10 is provided on a top surface of the print receiving material. This may allow for higher molding temperatures and pressure, but perhaps at a cost of image protection. In some implementations, we prefer to laser engrave or etch an encoded image, instead of printing.

In an alternative embodiment of the present invention, we provide a laminate layer or print receiving material (e.g., a Lexan® sheet) in an adjacently contacting position with a metal or aluminum layer. The laminate or print receiving material can be formed or shaped and then applied to a correspondingly shaped metal or aluminum layer. In some cases the print receiving material and metal or aluminum sheet are formed together. An adhesive layer can be used, in some cases, to help bond the print receiving material and metal or aluminum layer. In a first implementation of this embodiment, we apply a steganographically-encoded image to a bottom surface of the print receiving material. In a second implementation, we apply steganographic encoding to the metal or aluminum layer. This can be preformed through laser engraving, etching, surface texturing, printing, etc. The laminate layer is then applied over the metal layer.

Some print receiving materials may include a characteristic (e.g., reflectance, additives, additional layers, brushing, printing, etc.) that give an appearance of a metal or aluminum finish. Such print receiving materials may, of course, be used with the present invention. These types of print receiving materials provide a desirable metallic finished look, while still offering the advantages plastic.

The implementation of some of the functionality described above (including watermark or steganographic encoding and decoding) is straightforward to artisans in the field, and thus not further belabored here. Conventionally, such technology is implemented by suitable software, stored in long-term memory (e.g., disk, ROM, etc.), and transferred to temporary memory (e.g., RAM) for execution on an associated processor or processing circuitry. In other implementations, the functionality can be achieved by dedicated hardware, or by a combination of hardware and software. Reprogrammable logic, including FPGAs, can advantageously be employed in certain implementations.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

I claim:

1. A method of steganographically marking an object comprising:
    providing a steganographically encoded image, wherein the steganographic encoding is generally imperceptible to a human viewer of the image, but is machine-readable with computer analysis;
    printing the steganographically encoded image onto a print receiving material, the print receiving material comprising a top surface and a bottom surface, wherein the print receiving material receives the print on the bottom surface, and wherein the image is perceptible to a human viewer of the image when viewed through the top surface of the print receiving material;
    providing the printed encoded print receiving material to an injection mold, wherein the bottom surface of the printed encoded print receiving material is positioned so as to be adjacent to a second material to be injected into the mold; and
    injection molding the printed encoded print receiving material and the second material.

2. The method of claim 1, wherein the bottom surface of the printed encoded print receiving material contacts the second material.

3. The method of claim 2, wherein the bottom surface of the printed encoded print receiving material contacts the second material through at least one of the printed encoded image, a resin, a tie coat and an adhesive.

4. The method of claim 1, wherein the steganographic encoding comprises a digital watermark.

5. The method of claim 4, wherein the digital watermark comprises an orientation component.

6. The method of claim 4, wherein the digital watermark is redundantly encoded in the image.

7. The method of claim 1, wherein the steganographic encoding comprises at least two digital watermarks.

8. The method of claim 1, wherein the print receiving material comprises at least one of a polycarbonate (PC), acrylnitrile-butadiene-styrene (ABS), polyethylene terephthalate (PET) and acrylic.

9. The method of claim 8, wherein the second material comprises at least one of a plastic and polymer.

10. The method of claim 1, wherein the top surface of the print receiving material and the bottom surface of the print receiving material are separated by a measurable distance.

11. The method of claim 1, wherein the object comprises a cell phone faceplate.

12. The method of claim 1, wherein the object comprises a logo.

13. The method of claim 1, wherein the object comprises at least one of a personal digital assistant component, a handheld computer game component, a game console component, and a camera component.

14. The method of claim 1, wherein the image comprises at least one of a tint or background pattern.

15. The method of claim 1, wherein the steganographically-encoded image is encoded by adjusting transform domain coefficients corresponding to the image.

16. A cell phone faceplate manufactured according to the method of claim 1.

17. The method of claim 1, wherein the steganographic encoding is detectable with visible light scanning.

18. The method of claim 1, wherein the steganographic encoding is detectable with infrared scanning.

19. The method of claim 1, wherein the image comprises at least one of a company logo, photographic image, design and graphic.

20. The method of claim 1, wherein the image appears reversed to a human viewer of the image when viewed from the bottom surface of the print receiving material prior to said injection molding.

21. A component comprising:
a body comprising:
a first layer including a top surface and a bottom surface;
printing providing on the bottom surface of the first layer, wherein the printing conveys an image including steganographic encoding that is generally imperceptible to a human viewer thereof, but is machine-readable with computer analysis, and wherein the image is perceptible to a human viewer when viewed through the top surface of the first layer; and
a second layer adjacently arranged with respect to the bottom layer of the first layer.

22. The component according to claim 21, wherein the body comprises an injection molded body, and wherein the second layer comprises at least a polymetric material which is injection molded so as to be adjacently arranged to at least a portion of the bottom surface of the first layer, the injection molding forming a one-piece component.

23. The component of claim 22, wherein the second layer contacts the bottom surface of the first layer through the print.

24. The component of claim 22, wherein the steganographic encoding comprises a digital watermark.

25. The component of claim 22, wherein the component comprises a cell phone faceplate.

26. The component of claim 22 wherein the component comprises a company or product logo.

27. A method of authenticating the component of claim 21, comprising;
presenting the faceplate to an optical sensor, the optical sensor producing scan data;
analyzing the scan data to decode the steganographic encoding; and
determining based on the decoded steganographic encoding whether the faceplate is authentic.

28. The method of claim 27, wherein said steganographic encoding comprises a digital watermark.

29. The method of claim 27, wherein said steganographic encoding comprises at least two digital watermarks, and said determining determines whether the faceplate is authentic at least in part by cross-correlating information conveyed by the two digital watermarks.

30. A method of marking an object comprising:
providing a steganographic signal;
printing the steganographic signal onto a print receiving material, the print receiving material comprising a top surface and a bottom surface, wherein the print receiving material receives the print on the bottom surface, and wherein the printing comprises at least ultraviolet ink;
providing the printed encoded print receiving material to a mold, wherein the bottom surface of the printed encoded print receiving material is positioned so as to be adjacent to a second material to be provided to the mold; and
molding the printed encoded print receiving material and the second material.

31. A method of steganographically marking an object comprising:
providing a steganographically encoded image, wherein the steganographic encoding is general imperceptible to a human viewer of the image, but is machine-readable with computer analysis;
printing the steganographically encoded image onto a print receiving material, the print receiving material comprising a top surface and a bottom surface, wherein the print receiving material receives the print on the bottom surface, and wherein the image is perceptible to a human viewer of the image as viewed through the top surface of the print receiving material;
providing the printed encoded print receiving material to a mold, wherein the bottom surface of the printed encoded print receiving material is positioned so as to be adjacent to a second material to be injected into the mold; and
molding the printed encoded print receiving material and the second material.

32. The method of claim 31, wherein the molding process comprises at least one of heat and pressure.

33. A method for steganographically marking a molded article comprising:
providing a transparent substrate, the transparent substrate comprising a top surface and a bottom surface;
printing an image on the bottom surface of the substrate, wherein the image comprises machine-readable steganographic encoding;
forming the printed substrate into a three-dimensional shape;
providing the formed, printed substrate to a mold, the mold including a cavity surface to cooperate with the three-dimensional shape of the formed, printed substrate, wherein the top surface of the substrate is adjacently arranged with respect to the mold cavity surface; and
injecting a molten resin into the mold cavity directly against the bottom surface of the substrate to produce a one-piece, bonded thee-dimensional article.

34. The molded article according to claim 33, wherein the steganographic encoding comprises a calibration component.

35. The molded article according to claim 34, wherein the steganographic encoding is redundantly encoded in the image.

36. The molded article according to claim 35, wherein the steganographic encoding comprises at least one digital watermark.

* * * * *